US011269119B2

(12) United States Patent
Larsen

(10) Patent No.: US 11,269,119 B2
(45) Date of Patent: Mar. 8, 2022

(54) MONOLITHIC DOUBLE DIFFRACTIVE KINOFORM DOUBLET

(71) Applicant: United States of America, as represented by the Secretary of the Army, Fort Belvoir, VA (US)

(72) Inventor: Kim W. Larsen, Alexandria, VA (US)

(73) Assignee: UNITED STATES OF AMERICA, AS REPRESENTED BY THE SECRETARY OF THE ARMY, Washington, DC (US)

( * ) Notice: Subject to any disclaimer, the term of this patent is extended or adjusted under 35 U.S.C. 154(b) by 190 days.

(21) Appl. No.: 16/667,938

(22) Filed: Oct. 30, 2019

(65) Prior Publication Data

US 2020/0158929 A1 May 21, 2020

Related U.S. Application Data

(60) Provisional application No. 62/768,242, filed on Nov. 16, 2018.

(51) Int. Cl.
*G02B 5/18* (2006.01)

(52) U.S. Cl.
CPC .................................. *G02B 5/1852* (2013.01)

(58) Field of Classification Search
CPC .... G02B 5/1852; G02B 5/1876; G02B 5/188; G02B 5/189
See application file for complete search history.

(56) References Cited

U.S. PATENT DOCUMENTS 4,895,790 A 1/1990 Swanson et al.
5,260,828 A * 11/1993 Londono ............ G02B 27/0025 359/565
6,157,488 A * 12/2000 Ishii ..................... G02B 5/1866 359/565
2003/0161044 A1 * 8/2003 Tokoyoda ............ G02B 5/1866 359/569

OTHER PUBLICATIONS

Y. G. Soskind, "Field Guide to Diffractive Optics," SPIE Press (2011), p. 96.
T. Nakai, H. Ogawa, "Research on multi-layer diffractive optical elements and their application to camera lenses," Optical Society of America/DOMO 2002.

* cited by examiner

*Primary Examiner* — Robert E. Tallman
(74) *Attorney, Agent, or Firm* — Richard J. Kim

(57) ABSTRACT

A monolithic double diffractive kinoform doublet and a method for making such optical element is disclosed. In one embodiment, the optical element includes a first lens and a second lens. The first lens has a first refractive index. The first lens also has a first surface and a second surface. The first surface is a continuous, potentially flat surface for optical radiation to enter. The second lens has a second refractive index different from the first refractive index. The second lens has a first surface and a second surface. The first surface is in contact with the second surface of the first lens. The optical element has a peak diffraction efficiency at a first wavelength and at a second wavelength different than the first wavelength.

18 Claims, 5 Drawing Sheets

38
39
34
32
10
30
20
26,36
27,37
24
22

MONOLITHIC DOUBLE DIFFRACTIVE KINOFORM DOUBLET

CROSS-REFERENCE TO RELATED APPLICATIONS

This application claims priority to U.S. Provisional Patent Application No. 62/768,242, filed on Nov. 16, 2018, the disclosure of which is incorporated herein by reference in its entirety.

GOVERNMENT INTEREST

The invention described herein may be manufactured, used, sold, imported, and/or licensed by or for the Government of the United States of America.

FIELD OF THE INVENTION

The present subject matter relates generally to optical elements, especially optical elements which diffract optical radiation.

BACKGROUND OF THE INVENTION

Conventional optical detection apparatuses may include diffractive elements to focus optical beams. These diffractive elements are most efficient at a particular wavelength, and performance degrades the further the wavelength gets from the peak wavelength. Thus, these diffractive elements are most useful for a narrow band of wavelengths around the peak wavelength. This may be acceptable for optical detection apparatuses designed to operate in a narrow band of frequencies, but is not acceptable for a broadband detector.

SUMMARY OF THE INVENTION

The present invention broadly comprises an optical element and a method for making an optical element.

In one embodiment, the optical element includes a first lens and a second lens. The first lens has a first refractive index and a first power. The first lens also has a first surface and a second surface. The first surface of said first lens is a continuous surface for optical radiation to enter. The second surface of said first lens has multiple facets connected by passive facets providing physical offsets. The second lens has a second refractive index different from the first refractive index and a second power. The second lens has a first surface and a second surface. The first surface of the second lens is in contact with the second surface of the first lens. Both surfaces of the second lens have multiple facets connected by passive facets providing physical offsets. The optical element has a peak diffraction efficiency at a first wavelength and at a second wavelength different from the first wavelength.

BRIEF DESCRIPTION OF THE DRAWINGS

A full and enabling disclosure of the present subject matter, including the best mode thereof, directed to one of ordinary skill in the art, is set forth in the specification, which makes reference to the appended figures, in which.

DETAILED DESCRIPTION

Reference is presently made in detail to exemplary embodiments of the present subject matter, one or more examples of which are illustrated in or represented by the drawings. Each example is provided by way of explanation of the present subject matter, not limitation of the present subject matter. In fact, it will be apparent to those skilled in the art that various modifications and variations can be made in the present subject matter without departing from the scope or spirit of the present subject matter. For instance, features illustrated or described as part of one embodiment can be used with another embodiment to yield a still further embodiment. Thus, it is intended that the present subject matter covers such modifications and variations as being within the scope of the disclosure and equivalents thereof.

Figure 1A:
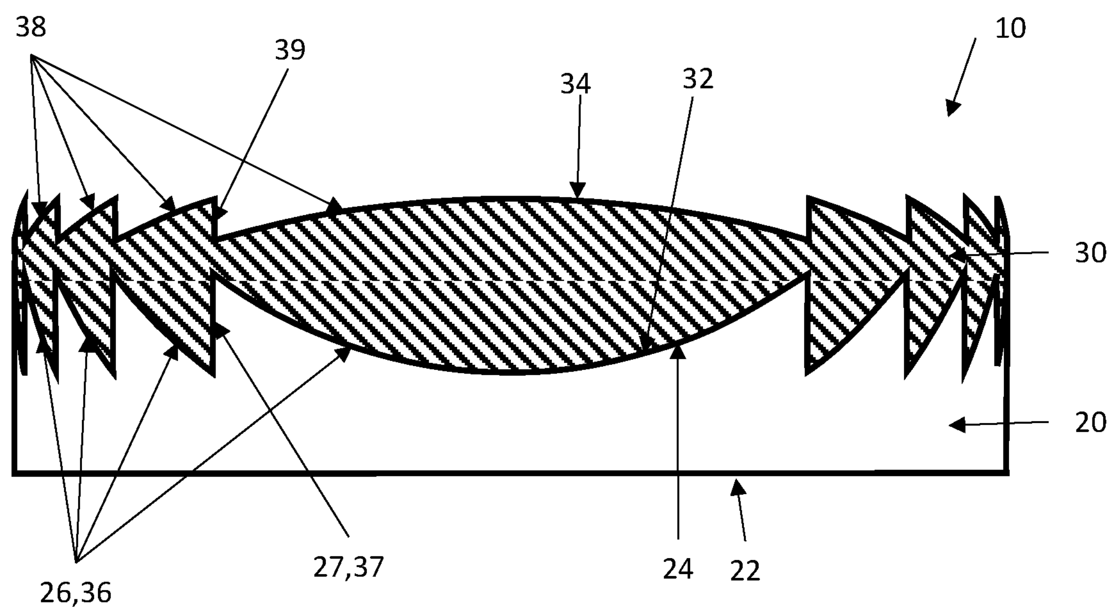
FIG. 1*a* illustrates a cross-section of an exemplary optical element according to a first embodiment of the present invention.

FIG. 1*a* illustrates an optical element 10 according to a first embodiment of the present invention. Optical element 10 includes a first lens 20 and a second lens 30. First lens 20 is made of a material having a first index of refraction $n_1$ and second lens 30 is made of a material having a second index of refraction $n_2$.

Figure 1B:
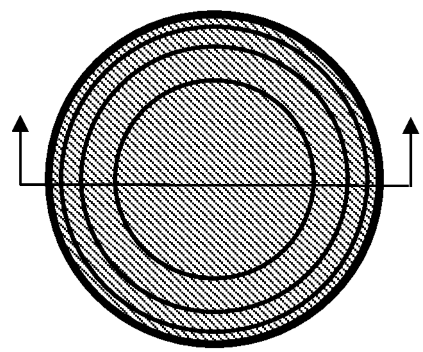
FIG. 1*b* illustrates a top view of an exemplary spherical optical element of the present invention.
Figure 1C:
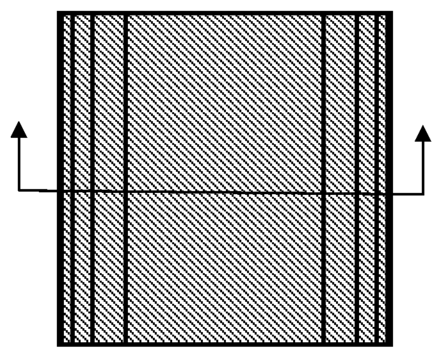
FIG. 1*c* illustrates a top view of an exemplary cylindrical or other optical element of the present invention.

FIG. 1*a* shows a cross-sectional view of an exemplary optical element 10 according to a first embodiment of the present invention. FIG. 1*a* shows a cross-section that may be taken across a diameter of a spherical lens, as shown in FIG. 1*b*. Alternatively, such cross-sectional view may be with respect to a cylindrical lens, or as a cross section of an arbitrary optical surface, as exemplified in FIG. 1*c*. All of spherical and cylindrical lenses and arbitrary optical surfaces are within the scope of the invention as claimed.

First lens 20 has a first surface 22 through which optical radiation enters. In the cross-sectional view of an exemplary optical element 10 shown in FIG. 1*a*, first surface 22 of first lens 20 is substantially flat. First lens 20 also has a second surface 24. Second lens 30 has a first surface 32 in contact with second surface 24 of first lens 20. Second lens 30 also has a second surface 34. Surfaces 24, 32, 34 are comprised of multiple facets 26, 36, 38 respectively, through which optical radiation enters and exits. These facets extend across the lens. These facets are generally curved, as shown in FIG. 1*a*.

Figure 2:
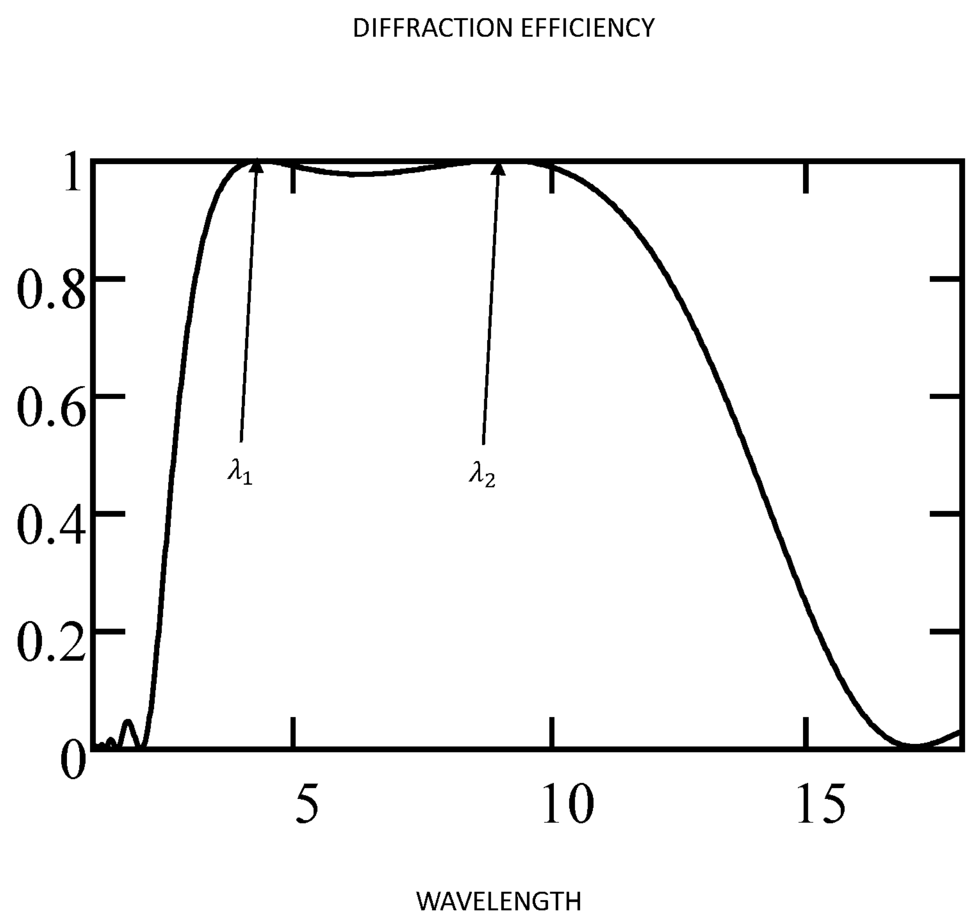
FIG. 2 shows a diffraction efficiency vs. wavelength plot for an embodiment of the present invention.

Optical element 10 is optimized to have a peak diffraction efficiency at a first wavelength and at a second wavelength different than the first wavelength. FIG. 2 shows an exemplary figure showing such an efficiency curve with two peaks at wavelengths $\lambda_1$ and $\lambda_2$. In one embodiment, the first wavelength and the second wavelength are both within the infrared region of the electromagnetic spectrum. However, the first and/or the second wavelength may also be within, for example, the visible region of the electromagnetic spectrum. These modifications are within the scope of the invention as claimed.

As shown in FIG. 1, each lens surface 24, 32, 34 can be considered to be made up of facets having a continuous surface profile with discontinuities. There may be passive facets 27, 37, 39 which are sloped portions that connect and physically offset facets 26, 36, 38. In the embodiment shown in FIG. 1, the passive facets are vertical.

In other embodiments, the passive facets 27, 37, 39 may not be perfectly vertical, but defined by a slope angle. The passive facets may also not be perfectly flat. These modifications are within the scope of the invention as claimed.

In one embodiment, the optical element 10 is parameterized by the intended optical phase offset across the optical element. One example of a phase offset is parabolic, and may be defined by the following equation $$\phi(r)=Ar^2$$

Phase is cyclical with period $2\pi$, and starting from r=0, the phase is an integer multiple of a at cut locations $r_i=\sqrt{2\pi i/|A|}$, where i is an integer. The discontinuities are when the phase cycles past an integer multiple of $2\pi$.

In one embodiment, each facet 26, 36, 38 is a parabola. In such a case, the surfaces 24, 32, 34 may be defined by the following surface sag equations, ignoring constant offsets and the passive facets:

$$\text{Surfaces 24/32: } z_1(r)=D_1r^2$$

$$\text{Surface 34: } z_2(r)=D_2r^2.$$

Figure 5:
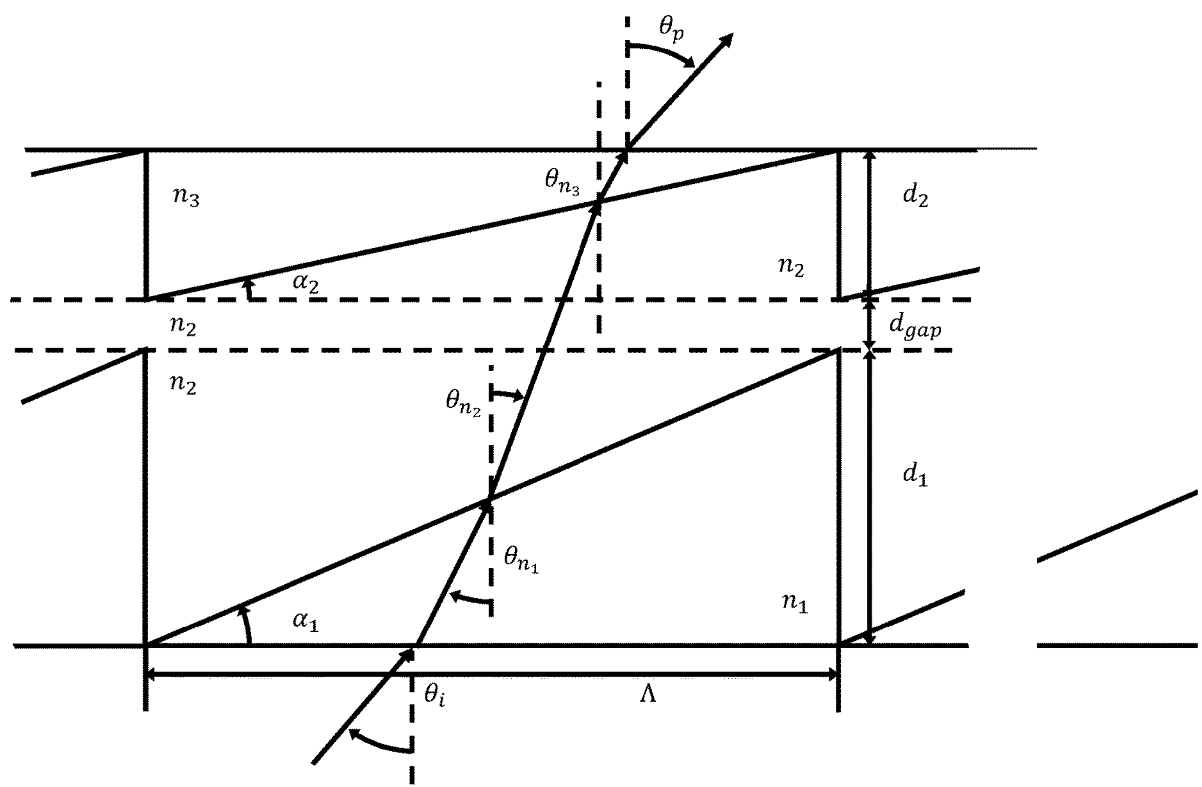
FIG. 5 shows the geometry of the facets of one embodiment of the present invention.

These equations may be determined by choosing two design wavelengths $\lambda_1$ and $\lambda_1$ and design diffractive mode m, then solving the following (relating values shown in FIG. 5):

$$(n_1 \cos \theta_{n1}-n_2 \cos \theta_{n2})\tan \alpha_1+(n_2 \cos \theta_{n2}-n_3 \cos \theta_{n3})\tan \alpha_2=m\lambda_1/\Lambda$$

$$(n_1 \cos \theta_{n1}-n_2 \cos \theta_{n2})\tan \alpha_1+(n_2 \cos \theta_{n2}-n_3 \cos \theta_{n3})\tan \alpha_2=m\lambda_2/\Lambda$$

by realizing the local pitch $\Lambda$ must be the same at each wavelength simultaneously to find the ratio of tan $\alpha_1$ and tan $\alpha_2$, the derivatives of the surface sag equations. Then use the following equations $$(n_1 \cos \theta_{n1}-n_2 \cos \theta_{n2})d_1+(n_2 \cos \theta_{n2}-n_3 \cos \theta_{n3})d_2=m\lambda_1$$

$$(n_1 \cos \theta_{n1}-n_2 \cos \theta_{n2})d_1+(n_2 \cos \theta_{n2}-n_3 \cos \theta_{n3})d_2=m\lambda_2$$

to solve for heights of vertical discontinuities $d_1$ and $d_2$ simultaneously. The passive facet locations are where the surface height difference equal $d_1$ and $d_2$ respectively. Not all design wavelength choices may lead to solutions with all or any material choices.

In one embodiment, the heights of the vertical discontinuities are constant across the lens. Equating the passive facet locations using the surface sag equations to the phase cut locations determines the surface sag coefficients $D_1$ and $D_2$.

In one embodiment, the heights of the vertical discontinuities vary across the lens. The surface sag equations must be adjusted or expanded to fit to the endpoint locations of each facet.

In one embodiment, the phase offset is defined by a generalized polynomial. The surface sag equations will be at the same polynomial order or higher.

In one embodiment, first lens 20 and second lens 30 form a monolithic double diffractive kinoform doublet having a focal length between 0 and infinity and corresponding optical power.

In one embodiment, first lens 20 and second lens 30 form a monolithic double diffractive kinoform doublet having a focal length between minus infinity and 0 and corresponding optical power.

Figure 3A:
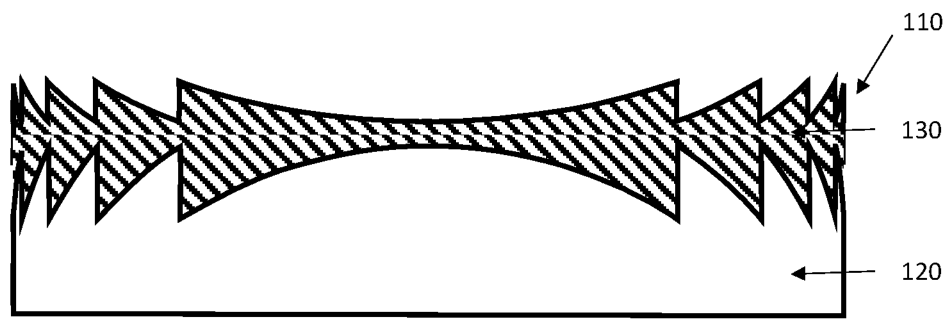
FIG. 3*a* shows a cross-section of a first exemplary optical element according to an embodiment of the present invention.
Figure 3B:
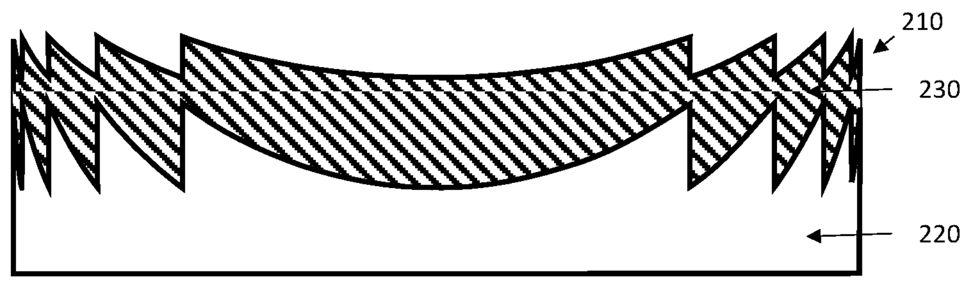
FIG. 3*b* shows a cross-section of a second exemplary optical element of the present invention.
Figure 3C:
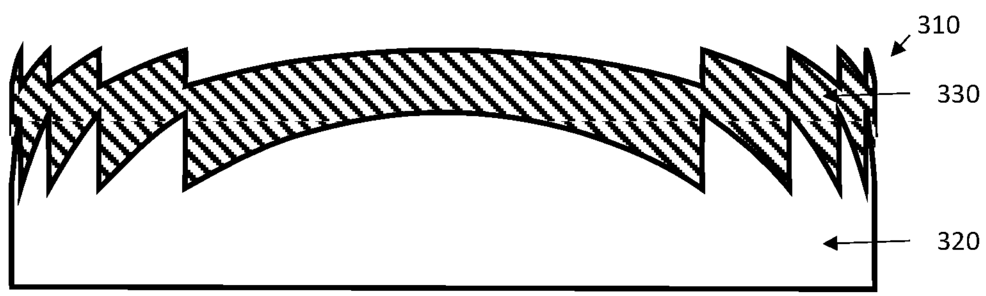
FIG. 3*c* shows a cross-section of a third exemplary optical element of the present invention.

FIG. 3*a* shows another embodiment of the present invention including a cross-section of optical element 110. Element 110 includes first lens 120 and second lens 130. However, the orientation of the curved surfaces have reversed. FIGS. 3*b* and 3*c* also show two more embodiments of the present invention including optical element 210 and 310, respectively, which include a first lens 220 and 320 and a second lens 230 and 330 for FIGS. 3*b* and 3*c*, respectively. Elements 210 and 310 each have one of the curved surfaces orientation reversed from the other elements 10 and 110. Material choice and design diffractive order determines which of the surface configurations shown by elements 10, 110, 210 and 310 is appropriate.

Figure 4A:
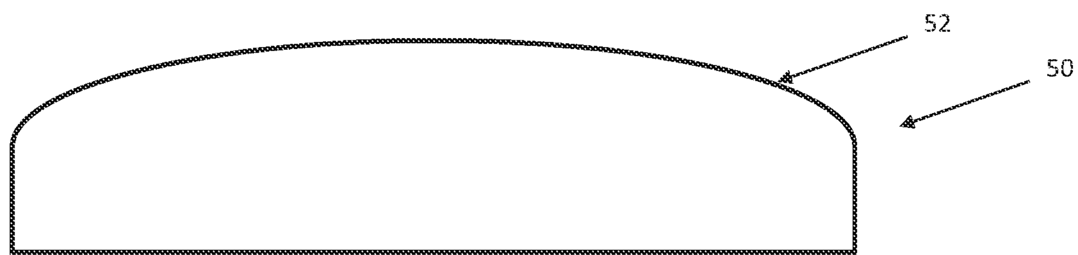
FIG. 4*a* shows a cross-section of an optical embodiment of the present invention.
Figure 4B:
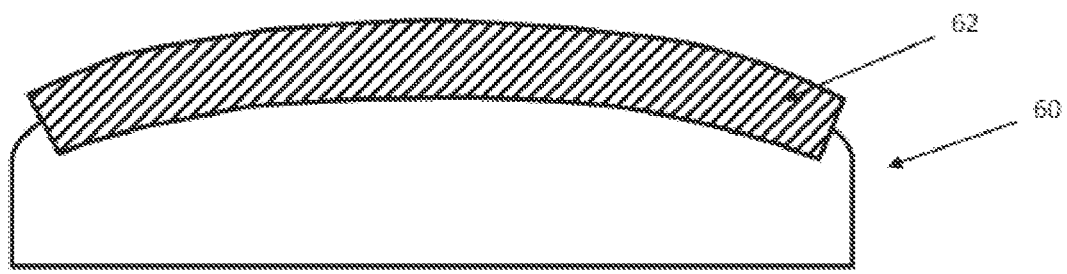
FIG. 4*b* shows a cross-section of an embedded optical element according to an embodiment of the present invention.

FIG. 4*a* shows another embodiment of the present invention. Optical element 50 is comprised of material $n_4$ and has an arbitrary surface sag or optical surface 52. Optical surface 52 has an optical power. Previous embodiments, such as 10, 110, 210 or 310, which have rectangular cross-sections as shown in FIGS. 1 and 3, can be applied to element 50 on surface 52 creating optical element 60, as exemplified in FIG. 4*b*. In each case, the previous embodiment (an optical element) is warped to match the curve in first surface 52 (FIG. 4*a*), as shown in FIG. 4*b* with the warped cross-section 62 embedded in element 60. The warped element retains the element thickness relative to the surface normal of the arbitrary continuous curve shape as shown. The optical surface of element 60 which includes warped element 62 and original surface 52 has optical power that is the sum of the original optical power of surface 52 and diffractive optical power of element 62. These modifications are also within the scope of the invention as disclosed.

In one embodiment, the first lens is made from ZnSe. The second lens may be made with ZnS. However, other materials may also be used and these alternative materials are within the scope of the invention as disclosed.

In one embodiment, the manufacturing process may be as follows:

1. Use diamond-turning to cut second surface 24 from a substrate of first optical quality material having an index of refraction of $n_1$;

2. Add second material having an index of refraction of $n_2$ onto second surface 24 to fill in the cuts, plus an additional "thick" layer, all of optical quality, by a deposition or growth process; and 3. Cut the second surface 34 into the second layer of material having an index of refraction $n_2$.

The present written description uses examples to disclose the present subject matter, including the best mode, and also to enable any person skilled in the art to practice the present subject matter, including making and using any devices or systems and performing any incorporated and/or associated methods. While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. An optical element comprising:

a first lens having a first refractive index, the first lens having a first surface and a second surface, the first surface of said first lens being a continuous surface for optical radiation to enter, the second surface of said first lens having multiple facets connected by passive facets providing physical offsets; and a second lens having a second refractive index different from the first refractive index, the second lens having a first surface and a second surface, the first surface of said second lens being in contact with the second surface of the first lens, and both surfaces of said second lens having multiple facets connected by passive facets providing physical offsets, wherein said optical element has a peak diffraction efficiency at a first wavelength and at a second wavelength different from the first wavelength, and wherein the first wavelength and the second wavelength are infrared wavelengths.

2. The optical element according to claim 1, wherein said optical element has a spherical shape.

3. The optical element according to claim 1, wherein said optical element has a cylindrical shape.

4. The optical element according to claim 1, wherein said first lens is made from ZnSe, and said second lens is based on ZnS.

5. The optical element according to claim 1, wherein said multiple facets are curved across the respective lens surface.

6. An optical element comprising:

a first lens having a first refractive index, the first lens having a first surface and a second surface, the first surface of said first lens being a continuous surface for optical radiation to enter, the second surface of said first lens having multiple facets connected by passive facets providing physical offsets; and a second lens having a second refractive index different from the first refractive index, the second lens having a first surface and a second surface, the first surface of said second lens being in contact with the second surface of the first lens, and both surfaces of said second lens having multiple facets connected by passive facets providing physical offsets, wherein said optical element has a peak diffraction efficiency at a first wavelength and at a second wavelength different from the first wavelength, and wherein the first wavelength and the second wavelength are visible wavelengths.

7. The optical element according to claim 1, wherein said multiple facets are comprised of:

continuous surface facets having a continuous surface profile interrupted by discontinuities; and passive facets providing said discontinuities which are sloped portions that connect and physically offset said continuous surface facets.

8. The optical element according to claim 7, wherein said first lens and second lens form a monolithic double diffractive kinoform doublet having a focal length between 0 and infinity and corresponding optical power.

9. The optical element according to claim 7, wherein said first lens and second lens form a monolithic double diffractive kinoform doublet having a focal length between minus infinity and 0 and corresponding optical power.

10. The optical element according to claim 7, wherein said passive facets may be either vertical or has a slope angle.

11. The optical element according to claim 7, wherein said discontinuities have a constant height across the respective lens.

12. The optical element according to claim 7, wherein said discontinuities vary in height across the respective lens.

13. The optical element according to claim 7, wherein the optical element is parameterized by an intended optical phase offset across the optical element.

14. The optical element according to claim 7, wherein the optical element is parameterized by a parabolic phase offset characterized by $\phi(r)=Ar^2$.

15. The optical element according to claim 14, wherein said phase offset is defined by a generalized polynomial.

16. A process for manufacturing an optical element according to claim 1, comprising the steps of:

forming said second surface of said first lens by diamond-turning cutting from a substrate of first optical quality material having said first refractive index to form said multiple facets;

adding a second material having a second refractive index onto said second surface of said first lens to fill into the multiple facets, and adding an additional thick layer of optical quality by a deposition or growth process, resulting in a second layer of material having said second refractive index; and cutting a second surface on an opposite optical side of the second layer of material having said second index of refraction to complete a formation of said second lens.

17. An optical element comprising:

an optical material having an optical surface characterized by a surface sag and an optical power;

a first lens having a first refractive index embedded onto said optical surface characterized by a surface sag, the first lens having a first surface and a second surface, the first surface of said first lens being a continuous surface in contact with said optical surface characterized by a surface sag of said optical material, the second surface of said first lens having multiple facets connected by passive facets providing physical offsets; and a second lens having a second refractive index different from the first refractive index, the second lens having a first surface and a second surface, the first surface of said second lens being in contact with the second surface of the first lens, and both surfaces of said second lens having multiple facets connected by passive facets providing physical offsets, wherein said optical element has a peak diffraction efficiency at a first wavelength and at a second wavelength different from the first wavelength, and wherein the first wavelength and the second wavelength are infrared wavelengths.

18. The optical element according to claim 17, wherein said first and second lenses are warped according to said surface sag to yield a diffractive optical power additive to said optical power of the optical material.

* * * * *